United States Patent [19]

Fodor

[11] 4,265,285

[45] May 5, 1981

[54] COMBINATION CROSS AND RIP CUT HANDSAW

[75] Inventor: William G. Fodor, Blairs, Va.

[73] Assignee: Sandvik, Inc., Greensboro, N.C.

[21] Appl. No.: 131,462

[22] Filed: Mar. 18, 1980

[51] Int. Cl.³ .............................................. B27B 21/00
[52] U.S. Cl. ................................................. 145/31 R
[58] Field of Search ............ 145/31 R, 31 AC, 31 AD

[56] References Cited

U.S. PATENT DOCUMENTS

| | | | |
|---|---|---|---|
| 1,919,748 | 7/1933 | Roberts | 145/31 R |
| 2,741,279 | 4/1956 | Stratton | 145/31 R |
| 3,005,478 | 10/1961 | Laviano | 145/31 R |
| 3,007,503 | 11/1961 | Kuemmerling | 145/31 R |

Primary Examiner—Nicholas P. Godici
Assistant Examiner—J. T. Zatarga
Attorney, Agent, or Firm—B. B. Olive

[57] ABSTRACT

A handsaw is provided having uniform repetitive groups of teeth with the tips thereof disposed in a straight line and with the depth and pitch diminishing in the forward direction. Each group of teeth in the illustrated embodiment is composed of four teeth of different pitch of 6, 8, 10 and 12 points. Although each tooth per group is of different length, the set of each tooth is equal with only a portion of each tooth being bent. Other critical angular relations are maintained.

6 Claims, 4 Drawing Figures

COMBINATION CROSS AND RIP CUT HANDSAW

BACKGROUND OF THE INVENTION

1. Field of the Invention

This invention relates to improvements in handsaws and more particularly to saws which have a combination of saw teeth to adapt to rip and crosscut sawing of wood.

2. Description of the Prior Art

Numerous attempts have been made to provide a combination rip and crosscut saw which provides a smooth, easy cut in wood and which also has an efficient cutting speed. Applicant is unaware of any such attempt which has proven completely satisfactory.

An example of such a combination rip and crosscut saw for sawing wood is found in U.S. Pat. No. 2,763,298. Also, U.S. Pat. Nos. 2,568,870; 2,579,728; 3,005,478 and 817,361 are illustrative of attempts to improve cutting efficiency by various tooth arrangements.

U.S. Pat. Nos. 29,688; 85,417; 1,850,478; 2,227,864 and 3,171,457 are illustrative of tooth modifications dealing mainly with cutting of metal, i.e., hacksaw blade constructions.

The tremendous number of prior art patents is in itself proof that the attempt to provide a combination rip and crosscut saw for sawing wood has been unsuccessful.

SUMMARY OF THE INVENTION

A handsaw for rip and crosscutting of wood has repeating groups of teeth with each tooth of each repeating group gradually diminishing in pitch and depth in the forward direction. The teeth of each repeating group is alternately set and beveled. In the illustrated embodiment, the set of the teeth is accomplished by bending equal lengths of all the teeth in each group. Various critical angular relations are also maintained to achieve the unique combination rip and crosscut wood saw of the invention.

DESCRIPTION OF THE PREFERRED EMBODIMENT

Figure 1:
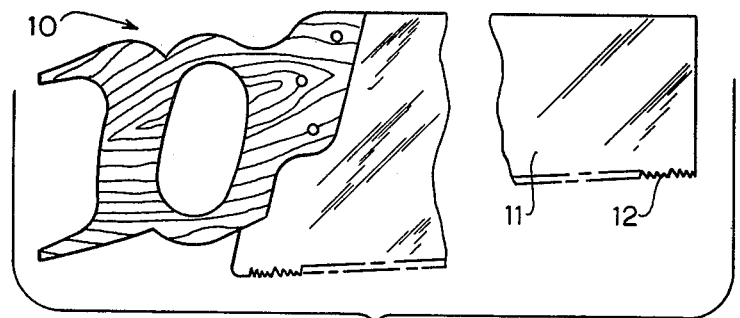
FIG. 1 is a fragmentary side elevation of a handsaw with the improved tooth arrangement.
Figure 2:
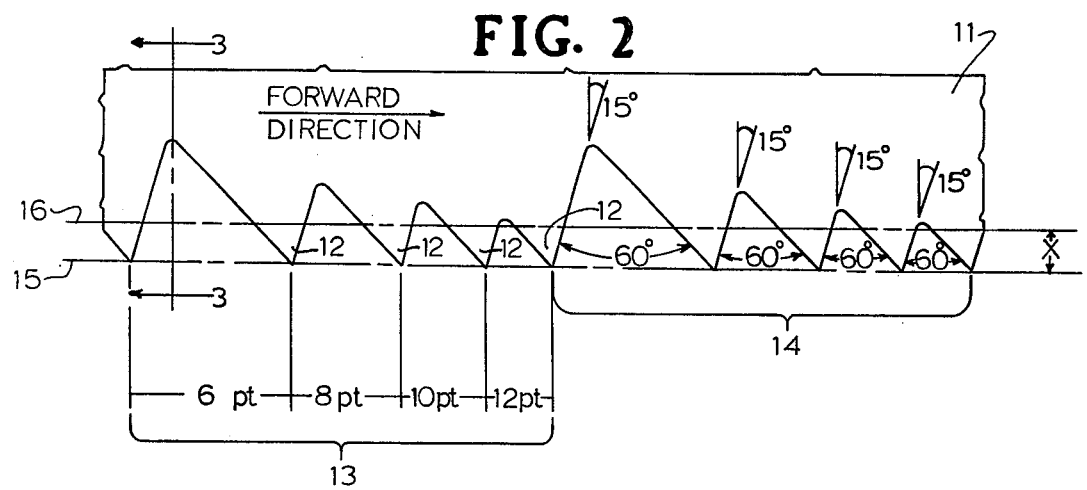
FIG. 2 is an enlarged fragmentary side elevation view of two repeating groups of plural teeth as employed by the present invention.
Figure 3:
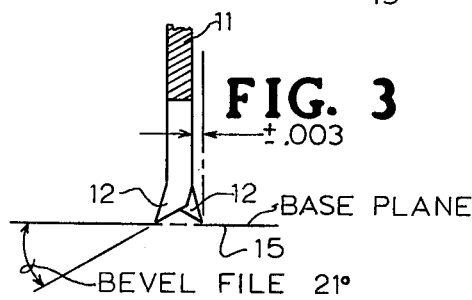
FIG. 3 is a fragmentary section view taken substantially along line 3—3 of FIG. 2.
Figure 4:
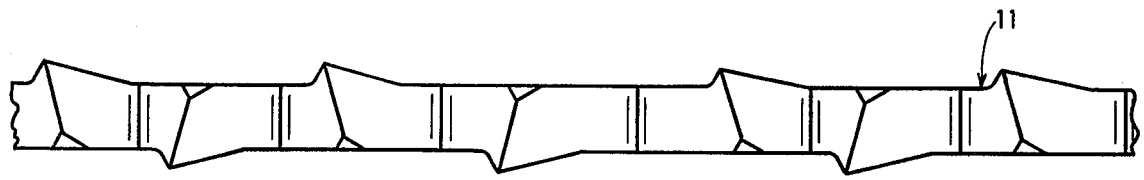
FIG. 4 is a fragmentary bottom plan view of the tooth arrangement of FIG. 2.

FIG. 1 generally illustrates a handsaw 10 with the improved blade construction 11 of the invention. FIGS. 2-4 are referred to for a description of the improved tooth arrangement of the invention.

In wood handsaws made according to the invention, the teeth 12 are arranged in successive groups or repeating groups as numbered 13, 14 in FIG. 2. Teeth 12 of each group gradually diminish in pitch and depth in the forward direction. Each group of teeth in the preferred embodiment is composed of four teeth. Each group 13, 14 varies in pitch within the range of 12 to 6 points. As illustrated, the preferred embodiment has teeth of 12 point, 10 point, 8 point and 6 point as best seen in FIG. 2.

All of the tips of the teeth for the entire length of the cutting edge of the handsaw 10 are disposed in a straight cutting line residing in a common plane normal to the plane of the blade as shown by line 15 of FIGS. 2 and 3. The depth of each tooth varies with the pitch. Each tooth receives the same set, preferably about 0.010". Each tooth is set by alternately bending each tooth outwardly about a bend line 16 extending for the length of the teeth. Bend line 16 is parallel with line 15 on the tips of the teeth and provides an equal distance X for all teeth 12 regardless of the pitch or tooth depth. Each tooth is also bevel filed preferably at an angle of about 21° relative to the base plane or about 69° with respect to the side surface of the saw. The gullet angle of each tooth is 60° and each tooth has a negative rake angle of 15°, as illustrated. Sharpening of teeth 12 is facilitated since only a 60° file is needed to sharpen any of the teeth. Also, cuts are started easily since there is no variation in setting angle.

In summary, the invention provides a combination cross and rip cut handsaw for cutting wood and which provides ease of starting and relatively fast, smooth and efficient cutting in either rip cut or crosscut directions.

What is claimed is:

1. A handsaw having repeating identical groups of plural teeth, within each group the teeth having gradually diminishing pitch and depth in the forward direction, each group having at least three teeth of different pitch within the range of 12 to 6 points, the teeth comprising each group being alternately set and bevel filed with the surface of the beveled surface of each tooth in all groups being at the same angle with respect to the plane of the opposed side surface of the tooth, with the set of the teeth being equal so that all teeth of all said groups extend laterally to the same extent, the included gullet angle for each tooth in all the groups being the same and the leading edge of each tooth in all the groups having the same negative forward rake angle and the points of the teeth of all the groups terminating on a common cutting line of the teeth in a plane normal to the plane of the blade.

2. A handsaw as claimed in claim 1 wherein each said group includes four teeth with 12 point, 10 point, 8 point and 6 point pitch respectively.

3. A handsaw as claimed in claim 1 wherein said included gullet angle is 60° and said negative rake angle is 15°.

4. A handsaw as claimed in claim 1 wherein said set is achieved by bending equal depth portions of the teeth comprising each group.

5. A handsaw as claimed in claim 1 wherein said same angle of said beveled surface is about 20°.

6. A handsaw as claimed in claim 2 wherein each said group includes four teeth with 12 point, 10 point, 8 point and 6 point pitch respectively, wherein said included gullet angle is 60° and said negative rake angle is 15° and wherein said set is achieved by bending equal depth portions of the teeth comprising each group.

* * * * *

UNITED STATES PATENT AND TRADEMARK OFFICE
CERTIFICATE OF CORRECTION

PATENT NO. : 4,265,285
DATED : May 5, 1981
INVENTOR(S) : William G. Fodor

It is certified that error appears in the above—identified patent and that said Letters Patent is hereby corrected as shown below:

Col. 2, line 57, "20°" should be --21°--.

*Signed and Sealed this*

*Twenty-eighth* Day of *July 1981*

[SEAL]

Attest:

GERALD J. MOSSINGHOFF

*Attesting Officer*   *Commissioner of Patents and Trademarks*